US 7,016,518 B2

(12) United States Patent
Vernon

(10) Patent No.: US 7,016,518 B2
(45) Date of Patent: Mar. 21, 2006

(54) VEHICLE LICENSE PLATE IMAGING AND READING SYSTEM FOR DAY AND NIGHT

(75) Inventor: Mark William Vernon, Newcastle Upon Tyne (GB)

(73) Assignee: Extreme CCTV Inc., Burnaby (CA)

( * ) Notice: Subject to any disclaimer, the term of this patent is extended or adjusted under 35 U.S.C. 154(b) by 588 days.

(21) Appl. No.: 10/097,936

(22) Filed: Mar. 15, 2002

(65) Prior Publication Data

US 2003/0174865 A1   Sep. 18, 2003

(51) Int. Cl.
*G06K 9/00* (2006.01)
(52) U.S. Cl. ............................. 382/105; 382/255; 356/3
(58) Field of Classification Search ............... 382/103, 382/104, 105, 106, 107, 122, 151, 154, 168, 382/177, 182, 190, 200, 203, 207, 210, 216, 382/219, 236, 255, 257, 260, 263, 286, 291, 382/295; 340/907; 348/113, 373; 356/634, 356/3; 235/468; 250/341.3; 396/428; 702/153; 209/644
See application file for complete search history.

(56) References Cited

U.S. PATENT DOCUMENTS

| | | | | |
|---|---|---|---|---|
| 5,628,411 A | * | 5/1997 | Mills et al. ................. | 209/644 |
| 5,689,304 A | * | 11/1997 | Jones et al. ................. | 348/373 |
| 5,809,161 A | * | 9/1998 | Auty et al. ................. | 382/104 |
| 6,357,937 B1 | * | 3/2002 | Stratton, Jr. ................. | 396/428 |
| 6,392,704 B1 | * | 5/2002 | Garcia-Ortiz ............... | 348/373 |
| 6,404,506 B1 | * | 6/2002 | Cheng et al. ................. | 356/634 |
| 6,465,787 B1 | * | 10/2002 | Coulter et al. ............ | 250/341.3 |
| 6,546,356 B1 | * | 4/2003 | Genest ......................... | 702/153 |
| 6,711,280 B1 | * | 3/2004 | Stafsudd et al. ............ | 382/106 |
| 6,832,728 B1 | * | 12/2004 | Kennedy ..................... | 235/468 |

* cited by examiner

*Primary Examiner*—Sanjiv Shah
*Assistant Examiner*—Seyed Azarian

(57) ABSTRACT

This invention provides an infrared illuminator and camera system for imaging of auto vehicle license plates. The system works in ambient light conditions, ranging from bright sunlight, to dim light, to dark, to zero ambient light. It yields high-contrast imaging of the letters and numbers on retro-reflective license plates. The images of the license letter and number combinations can be read manually by a remote operator. They can be converted to text format with optical character recognition computer hardware and software. The text data can then be compared to data files listing license numbers to provide further data about the owner of a licensed vehicle. A decision can be made quickly about whether to allow a vehicle to proceed through a gate, or whether to take other action. The system uses a mono camera that is enhanced for infrared sensitivity and combined with a high power infrared illuminator to maximize range at night, and with shutter speeds set up to capture clear license plate pictures even with fast moving vehicles and even with their headlights on and interfering with human observation of the license plates. Optical filtering to pass infrared in the range of the illuminator and to reduce light outside this range, combines with a lens set up, to avoid vertical smear and sensor overload caused by headlights at night and by highlight reflected glare from the sun in daytime.

20 Claims, 3 Drawing Sheets

VEHICLE LICENSE PLATE IMAGING AND READING SYSTEM FOR DAY AND NIGHT

BACKGROUND OF THE INVENTION

The majority of the world's vehicle license plates are retro-reflective by design. This means they reflect a large proportion of incident light back in the direction of the incident beam. They are designed this way in order to make them readable at night by shining a light on them. A car following another car can read the front car's rear license plate even at night because the plate reflects the following car's headlight beams back. The taillights of the car in front are typically not bright enough to overpower and obscure the light that is retro-reflected from the license plate of the car in front. It is however difficult or impossible to make out the front license plates of approaching traffic at night, because the headlights of the approaching traffic does overwhelm the visible light reflected from the front license plates. Even in reading the rear license plate of following traffic, the reader should be within an angle of 5 degrees of the illuminating source in order for the retro-reflecting surface to operate effectively and yield a sufficiently informative amount of light and contrast. Non-retro-reflective surfaces obey Snell's law where the light is reflected at an angle to the normal of the surface opposite but equal to the angle of the incident light. The retro-reflective nature of these plates is mainly for high visibility.

In trying to image a vehicle's license plates with CCD cameras several problems can occur. Firstly, at night there may be no ambient light to be reflected from a license number plate so an illuminator must be used. Secondly, if the vehicle's headlights are on, the cameras can be blinded by the glare from the headlights overriding any light information reflected from the license plate itself. The CCD elements become saturated and the stored charge over spills into adjacent cells resulting in a picture which is smeared and in which the license plate's numbers and letters either cannot be seen at all or are illegible. The CCD will generally try to handle this amount of light by increasing the shutter speed with the result that it can image the headlights perfectly but the gain is so reduced that the number plate disappears from the image. If the vehicle is moving fast it may travel some distance in the time that the CCD is collecting light. This can result in a blurred image.

An imaging system of this nature has several other requirements. If it is to be mounted on a highway, a toll both, or an unmanned security gate, there needs to be a reasonable lifetime. The requirement to cordon off one or more lanes of traffic and to hire a cherry picker lift to replace a bulb is undesirable. For mounting on a bridge or overpass over a highway there is a certain requirement for the range from camera to vehicle, depending on the height of the bridge. Also the unit cannot be at too acute an angle to the license plate, or the alphanumeric symbols on the license plate, will be too skewed for optical character recognition software to decipher them. The system needs also to cope with the elements, extreme cold, heat and rain.

The invention works well with retro-reflective plates because most such plates not only reflect visible light as intended, but also reflect infrared illumination, with the alpha-numeric symbols used in most license plate territories giving good contrast in the infrared spectrum as well as in visible light. Another background factor that creates the need for this invention, yet allows it to work effectively is that the headlights of vehicles produce most of their focussed output in the visible light spectrum, whereas their infrared output is more limited and diffuse.

DESCRIPTION OF THE PRIOR TECHNOLOGY

There are speed detection camera systems that capture license plates as part of a photograph of a speeding car. Software is available from a variety of companies that can take a video signal containing a moving vehicle and isolate the license plate. This software can then perform optical character recognition on the license plate. The software however relies on high-resolution images that are not blurred. The speed detection photographs often require human review, as the license plate is not imaged sufficiently well for computerized optical character recognition, due to low resolution, blurring due to speed of the vehicle, or low contrast due to poor light. The human review process is of little avail where the ambient daylight reaches a low level and vehicles begin switching on glaring headlights that interfere with the desired high signal to noise ratio in the video capturing of the light reflected from the license plate.

It is common to use infrared illumination for nighttime imaging of scenes having various contrasting reflective elements and backgrounds in the infrared spectrum. The prior art uses infrared LED illuminators that have very high current pulsed through an LED array. This has several disadvantages; the circuit complexity required to pulse the LEDs this leads to increase cost and reduced reliability; the requirement for the flash duration and rate to be set up for each installation. Stress on the LEDs is likely to be increased using the high current even for short pulses, possibly compromising reliability. Also range is still limited using this method.

Other methods exist for reading license plates at night that involve flashing visible light at the plates. However, cost is an issue with these systems, as is safety. The flashing can distract drivers at a psychological level, as well as impairing the visual information that would otherwise be available from the rest of the scene ahead.

None of the prior technology discloses the system of the present invention.

SUMMARY OF THE INVENTION

This invention provides an infrared illuminator and camera system for imaging of auto vehicle license plates. The system works in ambient light conditions ranging from bright sunlight, to dim light, to dark, to zero ambient light. It yields high-contrast imaging of the letters and numbers on retro-reflective license plates. The images of the license letter and number combinations can be read manually by a remote operator. They can be converted to text format with optical character recognition computer hardware and software. The text data can then be compared to data files listing license numbers to provide further data about the owner of a licensed vehicle. A decision can be made quickly about whether to allow a vehicle to proceed through a gate, or whether to take other action. The system uses a mono camera that is enhanced for infrared sensitivity, combined with a high power infrared illuminator to maximize range at night, and with shutter speeds set up to capture clear license plate pictures even with fast moving vehicles, and even with bright headlights on the vehicles interfering with human observation of the license plates. Optical filtering too pass infrared in the range of the illuminator and to reduce light outside this range combines with a lens set up to avoid vertical smear and sensor overload caused by headlights at night and by highlight reflected glare from the sun in daylight hours.

The system uses a high powered infrared illuminator capable of providing adequate illumination over 100 meters for a CCTV surveillance system, but a range of 12 meters to 35 meters will solve the majority of license plate imaging applications. This allows the invention to under-run the bulb in the illuminator by supplying it with reduced voltage and current. Under-running the bulb increases the bulb life. Average bulb life can be extended up to 10 years in this manner. Because the illuminator produces wavelengths of light only in the infrared, a matched infrared filter can be used over the camera that blocks much of electromagnetic spectrum outside of the infrared illuminator's wavelength frequency range. This causes the headlights of a vehicle not to overpower the license plate image. And during the daytime, it has the salutary effect of reducing sunlight glare. The reduced spectrum of sunlight entering the camera is more than sufficient to make day images of the license plate. Full sunlight and even bright headlights that are unfiltered could overload the CCD sensor in the camera. To further reduce the effects of headlights and sunlight a lens is used that has a very small aperture, effected by adjusting the iris. This drastically cuts down the amount of light falling on the sensor. The illuminator then has to be powerful enough to overcome this aperture setting when reflected from the license plate. The small aperture has the added advantage of producing a large depth of field in focus through the lens of the camera. By forcing the light that falls on the sensor to come through a small central portion of the lens the image is kept in sharp focus for a large range of object distances. This is important as the car may be traveling rapidly towards the system and several in focus images can be taken within an extended in-focus range while the vehicle travels within that range. It allows any optical character recognition software to make several attempts at reading the plate, thereby increasing the successful recognition rate.

To stop the camera from adjusting its shutter speed up and down depending on the light falling on the CCD sensor, it must be set to a fixed shutter speed. This shutter speed is chosen to be $\frac{1}{1000}$ of a second, as this speed is fast enough to freeze the action of a fast moving vehicle sufficiently for character recognition of the license plate alphanumeric symbols. Experiments have proven that even with a high power illuminator under-run at a voltage or current rate to provide a predicted 10 years average bulb life there is enough remaining power to allow a very small aperture at the indicated shutter speed. It has also been demonstrated that the CCD sensor will image the license plate numbers and letters correctly, allowing optical character recognition, even with headlights on full beam and aimed at the camera.

The invention is essentially a license plate reader system for all ambient light conditions, comprising a high power infrared illuminator for night and a camera that:
a) is enhanced for infrared sensitivity and resolution;
b) has shutter speeds set up to capture clear license plate pictures on vehicles moving at any speed up to a predicted speed limit for the vehicles, even with their headlights on;
c) has optical filtering of light wavelengths outside the range of light wavelength emitted by the high power infrared illuminator, in order to avoid sensor overload from headlights and reflected glare from sunlight and to protect the camera from overheating due to solar radiation.

The camera is preferably a monochrome camera that has high resolution and low inter-pixel leakage. It has a lens set up with a small aperture formed by an iris to avoid sensor overload, to increase depth of field for focussed images of license plates on moving vehicles, and to avoid vertical smearing of images. It has a sunshield to avoid vertical smear from overhead ambient light on images captured by the camera.

The high power infrared illuminator should provide illumination over a distance of at least 35 meters from the camera at an intensity to capture clear license plate pictures even with fast moving vehicles and even with their headlights on, and have sufficient power to allow closed circuit television surveillance over a distance of at least 100 meters, thereby allowing its bulb source or sources of infrared illumination to be powered with an electrical voltage that is lower than the infrared light source's normal voltage operating range in order to extend bulb life in the illuminator.

The high power infrared illuminator could emit wavelengths in the range 830 to 1000 nanometers, in which case the optical filtering should comprise a filter that passes infrared wavelengths in the range of 830 to 1000 nanometers and restricts wavelengths of light below and above that range.

The shutter speed of $\frac{1}{1000}$ of a second in the above-described system allows it to capture license plate images from vehicles travelling even at high rates of speed, anywhere in the range of 0 to 100 miles per hour.

When the system is contained in a weather-tight ruggedized housing, and with an armoured able cable for sending a video signal from the system to a remote location, it is suited for combination with a second such system, each system located a measured distance apart, in order to capture separate license plate images in conjunction with the systems being connected to a timer or the systems having synchronized clocks for use in speed monitoring of vehicles.

A prime use of the system would be for security control at a gate, with the system integrated with computer hardware and software such that images of license plates are downloaded from the license plate reader system for processing by an automated optical character recognition module, and in which alphanumeric characters read from a license plate of a vehicle are compared with data from license plate databases in preparation for a response to the vehicle.

DESCRIPTION OF THE DRAWINGS

FIG. 3 is a front view of a vehicle approaching at night with headlights on.

DETAILED DESCRIPTION

Figure 1:
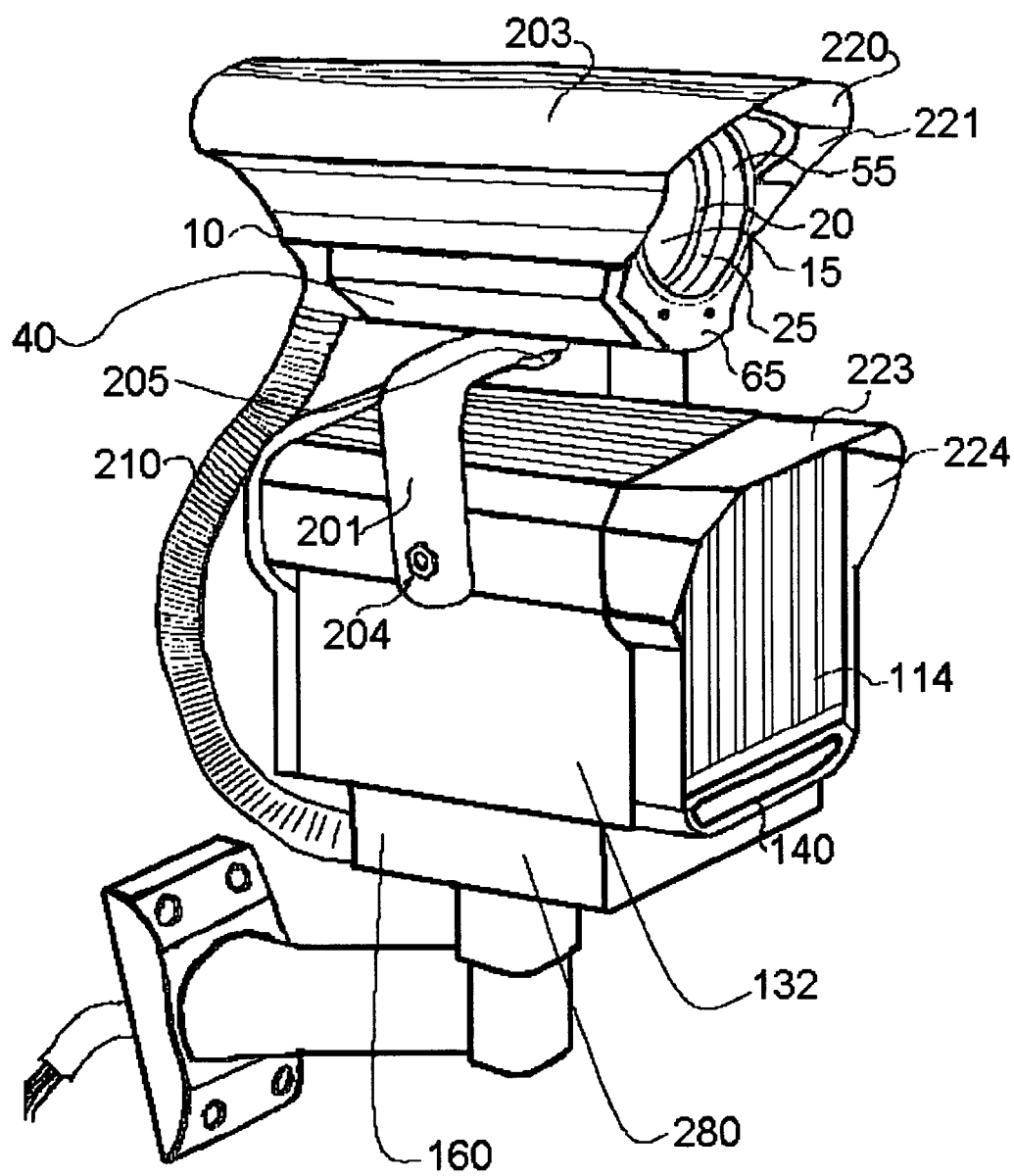
FIG. 1 is an isometric view of the license plate reader camera system of the present invention.
Figure 2:
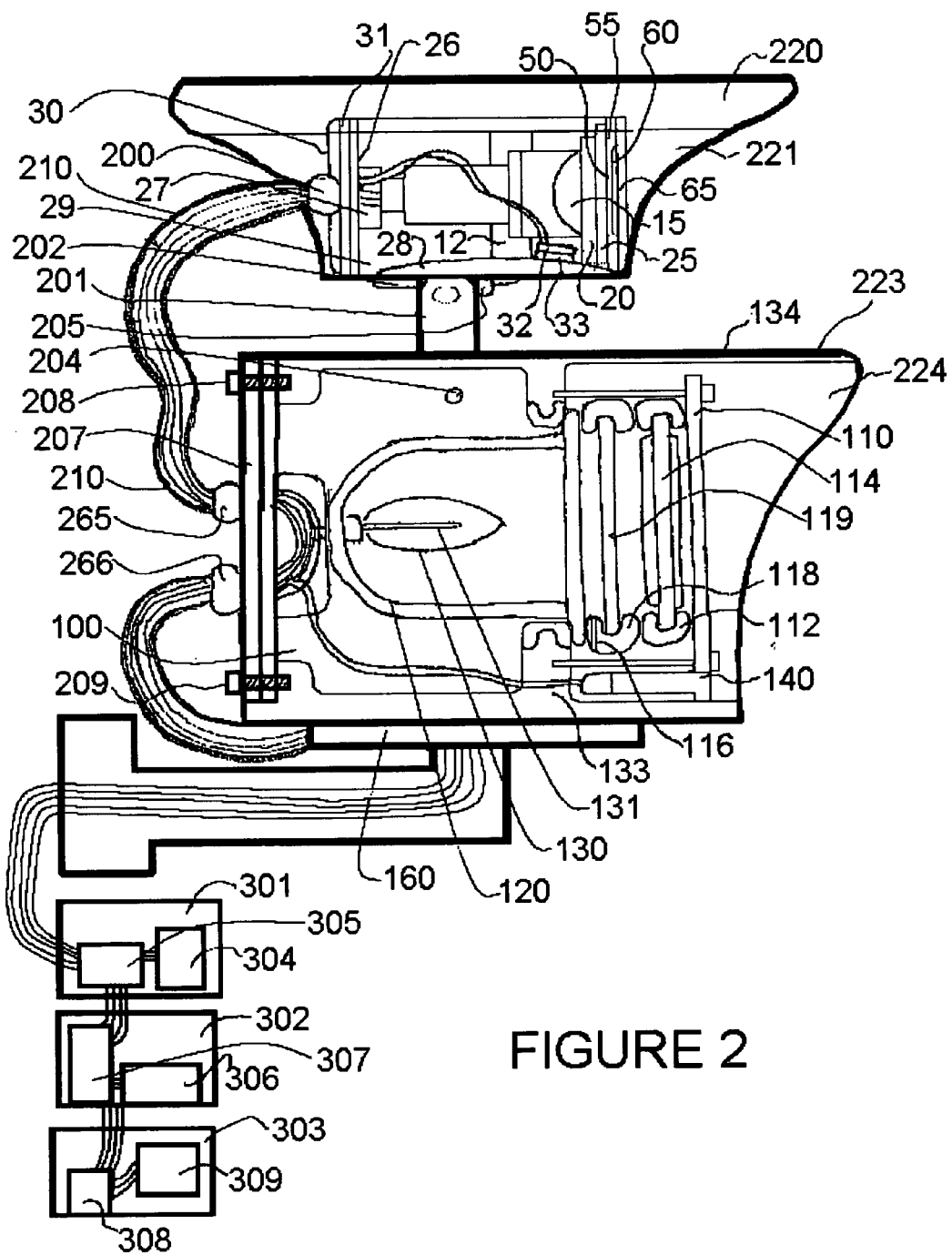
FIG. 2 is a side cross-sectional view of the license plate reader camera system of FIG. 1.

Referring to FIGS. 1 and 2, the system comprises a mono CCD camera 10 enhanced for infrared sensitivity, reduced inter-pixel leakage and high resolution. The lens 15 has a focus adjuster 20 and an aperture iris adjuster 25. The lens 15 has a very small aperture formed by the aperture iris adjuster, preferably set to F8 to reduce the amount of light falling on the sensor from vehicle headlights and reflected sunlight. This avoids camera sensor overload, increases depth of field for focussed images of license plates on moving vehicles, and avoids vertical smearing of images. The lens 15 screws into the camera case 26 via the camera mount 12. The camera 10 and lens 15 attach to a sprung carriage 28, which facilitates the mounting into the main camera housing 40. The sprung edges of the carriage 28 fit into grooves as at 29 in the main camera housing 40. At the front of the main camera housing 40 the camera infrared filter 50 and plain glass window 60 are held in a double moulded gasket 55. They are held in place by the front casting 65 which is screwed into the main housing 40 compressing the double moulded gasket 55. This seals the front of the unit against water ingress.

A back casting 30 is screwed into the rear of the main camera housing 40 compressing the back gasket 31. This makes a weather tight seal to the back of the main camera housing 40. A terminal block 27 connects the camera 10 to external cables. Armoured conduit 210 contains wiring carries the video signal from the camera 10 and supplies power to the camera 10 and small heater 32. The armoured conduit 210 enters the main camera housing 40 via an M16 swivel gland 200. The small heater 32 is secured in place by an adhesive pad 33 at the front of the housing 40 and can be thermostatically controlled, ensuring that the lens does not mist up and that the internal temperature of the unit does not become too cold for the operating temperature range of the camera 10. If the shutter speed of the camera is approximately $1/1000$ of a second, the video imaging from the camera 10 can capture license plate images from vehicles travelling at speeds in the range of 0 to 100 miles per hour.

The high power infrared illuminator comprises an infrared light bulb 130 that emits wavelengths in the range 830 to 1000 nanometers. The infrared bulb 130 is specially chosen to have a small filament 131 that acts more like a point source than most normal bulbs. This allows use of a specially designed reflector 120 that is gold-plated to optimize the amount of infrared light that is reflected out of the lamp 132. The infrared bulb 130 is also chosen for high output and efficiency. The infrared bulb 130 is mounted to the bulb carriage 133 by two screws 134 and 135. The reflector is held in place by two arms on the bulb carriage and adhesive is used to bond it in place. The bulb carriage 133 is mounted in the lamp housing 100. The electrical supply wires, camera control wires, video output wires, are routed via a block 280 attached to the bottom of the lamp. The back casting 207 clamps the lamp gasket 210 to the lamp carriage and housing 100 with screws 208 and 209.

The lens 114 spreads the light out horizontally to give a useable horizontal field of view in the range of 10 to 30 degrees depending on the lens fitted which in turn depends on the desired range. The lens o-ring 112 fits around the edge of the front face of the lens 114. The lens 114 and o-ring 112 sit inside the lamp front casting 110. This in turn screws on to the lamp main housing 100, compressing the filter gasket 118. A dichromatic filter 119 sits inside the filter gasket 118. The filter only passes infrared wavelengths in the region of 830 nm to 1000 nm. This seals the front of the lamp 132 against water ingress. The filter gasket 118 has a bleed channel 116 of very fine bore which is too small to allow water to pass but does allow the pressure inside the lamp to equalize with atmospheric pressure. This ensures the glass lens 114 and filter 119 do not crack due to build up of internal pressure.

The lamp 132 is mounted on the mounting block 160. The armoured conduit 210 from the camera assembly is connected to the back of the block 160. A piece of M20 armoured conduit can also be connected via a gland to the back of the block and allows the wires from the lamp 132 and the camera 10 to be routed safely to the power supply unit 301 and thereby to the video-processing module 302 and the computer network control module 304. The power supply unit 301 contains a transformer 304 and power control circuitry 305 powering the lamp 132, the camera 10 and the heater 32. The power control circuitry 305 can turn on the lamp based on information from ambient light sensor 140. The video-processing module 302 can include an optical character recognition module 306, as well as camera focus and aperture control 307. The processed video information is then fed to computer network control module 303, which can include information storage module 308 and display module 309.

A U bracket 201 is connected to a slide plate 202, which is fixed to the underside of camera assembly 203. The U bracket 201 and hence the camera assembly 203 are attached to the lamp housing 100. The camera assembly 203 can be angled in relation to the lamp 132 to achieve the best picture by tilting the U bracket 201. Grub screws 204 and 205 in the U bracket 201 lock the final position.

An extended sunshield 220 can be fitted to the top of the camera assembly 203. Mounted to the bottom of the sunshield is a cowl 221, which protects against rain, sleet and snow. A lamp sunshield 223 and lamp cowl 224 are also fitted to the lamp 132 for environmental protection.

Figure 3:
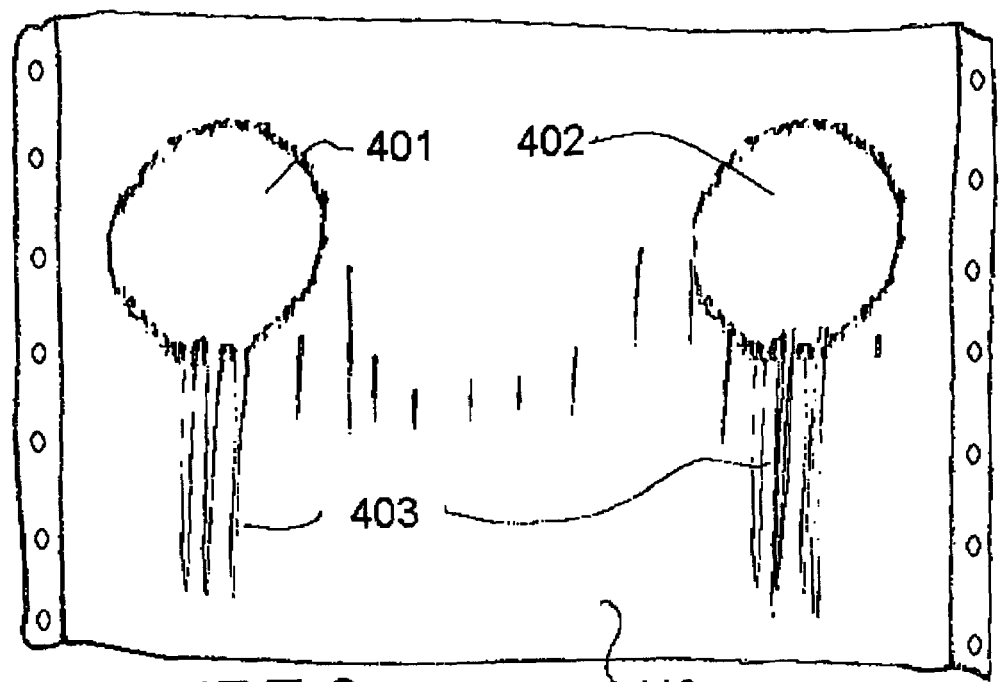
Figure 4:
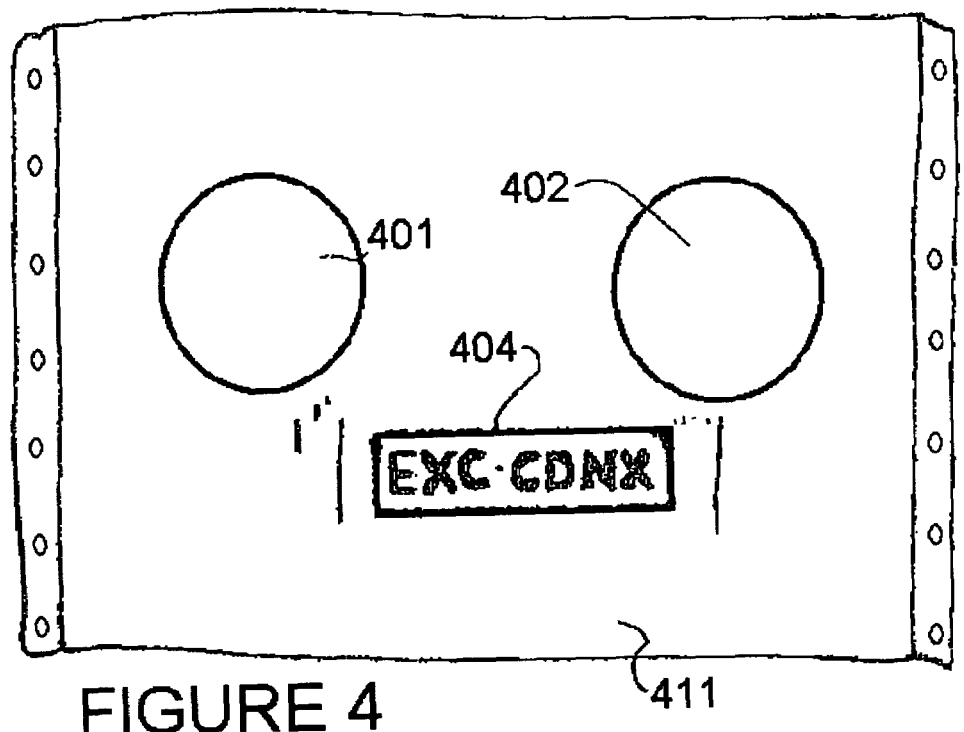
FIG. 4 is a front view of the vehicle of FIG. 3, with the license plate readable by the system of FIG. 1.

Referring to FIG. 3, a visible light photographic image 410 of an approaching vehicle at night shows the vehicle's headlights 401 and 402 make too much glare 403 to see the license plate at all in the visible light spectrum. In FIG. 4, the infrared image 441 of the same approaching vehicle shows how the headlights 401 and 402 reflect some infrared light and are visible to the license plate reader camera system, but are not bright enough in the infrared spectrum to preclude reading of the license plate 404 by the license plate reader camera system. The license plate 404 and its letters EXC-CNDX can be read even at night, as the license plate 404 reflects the infrared illumination from the license plate reader camera system.

The system is not by itself a speed camera but by placing two units a known distance apart, they can be used together for journey time monitoring and thus used for traffic regulation enforcement. In this capacity the units would be ruggedized and made vandal proof with cable management systems.

The within-described invention may be embodied in other specific forms and with additional options and accessories and applied to other imaging problems where visible light is insufficient or actually interfering, without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalence of the claims are therefore intended to be embraced therein.

I claim:

1. A license plate reader system for all ambient light conditions, comprising a high power infrared illuminator for night and a monochrome camera that:
   a) is enhanced for infrared sensitivity and resolution;
   b) has shutter speeds set up to capture clear license plate pictures on vehicles moving at any speed up to a predicted speed limit for the vehicles, even with their headlights on;
   c) has optical filtering of light wavelengths outside the range of light wavelength emitted by the high power infrared illuminator, in order to avoid sensor overload from headlights and reflected glare from sunlight;

d) has high resolution and low inter-pixel leakage;
e) has a lens set up with a small aperture formed by an iris to avoid sensor overload, to increase depth of field for focused images of license plates on moving vehicles, and to avoid vertical smearing of images;
in which the high power infrared illuminator provides illumination of over a distance of at least 35 meters from the camera at an intensity to capture clear license plate pictures even with fast moving vehicles and even with their headlights on.

2. The license plate reader system of claim 1, in which the camera has a sunshield to avoid vertical smear from overhead ambient light on images captured by the camera.

3. The license plate reader system of claim 1, in which the high power infrared illuminator has sufficient power to allow closed circuit television surveillance over a distance of at least 100 meters.

4. The license plate reader system of claim 3, in which the high power infrared illuminator comprises an infrared light source that is powered with an electrical voltage that is lower than the infrared light source's normal voltage operating range in order to extend bulb life in the illuminator.

5. The license plate reader system of claim 1, in which the high power infrared illuminator emits wavelengths in the range of 830 to 1000 nanometers, and the optical filtering comprises a filter that passes infrared wavelengths in the range of 830 to 1000 nanometers, and restricts wavelengths of light below and above that range.

6. The license plate reader system of claim 1, in which the shutter speed is $1/1000$ of a second in order to capture license plate images from vehicles travelling at speeds in the range of 0 to 100 miles per hour.

7. The license plate reader system of claim 1, in which the camera and the illuminator are each contained in a weather-tight housing.

8. The license plate reader system of claim 1, further comprising an armoured cable for sending a video signal from the system to a remote location.

9. The license plate reader system of claim 1, in which images of license plates sent for processing by an automated optical character recognition module.

10. The license plate reader system of claim 1, in which alphanumeric characters read from a license plate of a vehicle are compared with data from license plate databases in preparation for a response to the vehicle.

11. The license plate reader system of claim 1, father comprising a second such system, each system located a measured distance apart, in order to capture separate and timed license plate images for use in speed monitoring.

12. The license plate reader system of claim 1, in which the camera is mounted in a camera housing and a heater is mounted within the housing to keep the camera within an operating temperature range.

13. The license plate reader system of claim 1, in which the illuminator is contained in a lamp housing with gaskets to seal against weather conditions, but in which the gasket has a bleed channel to allow vapour to escape from the interior of the housing.

14. The license plate reader system of claim 1, in which the camera is contained in a camera housing that is mounted with a U-bracket to a lamp housing for the illuminator in order to allow the angle of the camera to be adjusted with respect to the illuminator.

15. The license plate reader system of claim 1, in which the camera and the illuminator are each provided with a sunshield.

16. The license plate reader system of claim 1, in which:
a) the camera has a sunshield to avoid vertical smear from overhead ambient light on images captured by the camera;
b) the high power infrared illuminator has sufficient power to allow closed circuit television surveillance over a distance of at least 100 meters;
c) the high power infrared illuminator comprises an infrared light source that is powered with an electrical voltage that is lower than the infrared light source's normal voltage operating range in order to extend bulb life in the illuminator;
d) the high power infrared illuminator emits wavelengths in the range 830 to 1000 nanometers, and the optical filtering comprises a filter that passes infrared wavelengths in the range of 830 to 1000 nanometers, and restricts wavelengths of light below and above that range;
e) the shutter speed is $1/1000$ of a second in order to capture license plate images from vehicles travelling at speeds in the range of 0 to 100 miles per hour;
f) the system is contained in a weather-tight housing.

17. The license plate reader system of claim 16, further comprising an armoured cable for sending a video signal from the system to a remote location and a second such system located a measured distance apart, in order to capture, separate, and time license plate images for use in speed monitoring.

18. The license plate reader system of claim 16, in which images of license plates are downloaded for processing by an automated optical character recognition module.

19. The license plate reader system of claim 18, in which alphanumeric characters read from a license plate of a vehicle are compared with data from license plate databases in preparation for a response to the vehicle.

20. The license plate reader system of claim 16, in which:
a) the camera is mounted in a camera housing and a heater is mounted within the housing to keep the camera within an operating temperature range;
b) the illuminator is contained in a lamp housing with gaskets to seal against weather conditions, but in which the gasket has a bleed channel to allow vapor to escape from the interior of the housing;
c) the camera is contained in a camera housing that is mounted with a U-bracket to a lamp housing for the illuminator in order to allow the angle of the camera to be adjusted with respect to the illuminator;
d) the camera and the illuminator are each provided with a sunshield.

* * * * *